(12) United States Patent
Kraiss et al.

(10) Patent No.: US 7,558,726 B2
(45) Date of Patent: Jul. 7, 2009

(54) MULTI-LANGUAGE SUPPORT FOR DATA MINING MODELS

(75) Inventors: Achim Kraiss, Lautertal (DE); Harish Hoskere Mahabal, Bangalore (IN); Dipankar Roy, Bangalore (IN)

(73) Assignee: SAP AG, Walldorf (DE)

( * ) Notice: Subject to any disclaimer, the term of this patent is extended or adjusted under 35 U.S.C. 154(b) by 1010 days.

(21) Appl. No.: 10/664,771

(22) Filed: Sep. 17, 2003

(65) Prior Publication Data

US 2004/0230417 A1 Nov. 18, 2004

Related U.S. Application Data

(60) Provisional application No. 60/471,048, filed on May 16, 2003.

(51) Int. Cl.
*G06F 17/28* (2006.01)
(52) U.S. Cl. .................. 704/7; 704/8; 704/9; 704/10
(58) Field of Classification Search ............... None
See application file for complete search history.

(56) References Cited

U.S. PATENT DOCUMENTS

| | | | |
|---|---|---|---|
| 6,782,390 B2 * | 8/2004 | Lee et al. ............ | 707/101 |
| 6,865,573 B1 * | 3/2005 | Hornick et al. ........ | 707/6 |
| 6,883,142 B2 * | 4/2005 | Shimamoto et al. ..... | 715/744 |
| 6,931,391 B2 * | 8/2005 | Tang et al. ............ | 707/2 |
| 6,941,318 B1 * | 9/2005 | Tamayo et al. ......... | 707/102 |
| 7,024,417 B1 * | 4/2006 | Russakovsky et al. ... | 707/101 |
| 2002/0032740 A1 | 3/2002 | Stern et al. | |
| 2002/0035486 A1 * | 3/2002 | Huyn et al. ........... | 705/3 |

FOREIGN PATENT DOCUMENTS

| | | |
|---|---|---|
| WO | 01/65388 | 9/2001 |
| WO | 01/69420 | 9/2001 |

OTHER PUBLICATIONS http://www.sas.com/news/preleases/111802/news2.html—"SAS Acquires Technology to Track Customer Behavior In Real-Time," printed from the Internet Apr. 18, 2003, 2 ps.
http://www.ephiphany.com/news/2002press/2002_08_27. html—E.Piphany—"E. Piphany Real-Time Wins CRM Excellence Award from Customer Inter@action Solutions Magazine," printed from the Internet Apr. 18, 2003, 2 ps.
http://www.verilytics.com/products/index.html—"Verilytics Products," printed from the Internet Apr. 18, 2003, 2 ps.

(Continued)

*Primary Examiner*—Michael N Opsasnick
*Assistant Examiner*—Leonard Saint Cyr
(74) *Attorney, Agent, or Firm*—Fish & Richardson P.C.

(57) ABSTRACT

An analytical application provider may provide certain middleware functionality that includes updating model output to include textual descriptions of the data mining model and the data fields in a language selected by a front-end application. Certain implementations of the invention relate to a computer-implemented method for providing multi-language support for data mining models. Some implementations relate to computer-implemented method for outputting textual descriptions of data fields in a data mining model in a selected language.

18 Claims, 7 Drawing Sheets

OTHER PUBLICATIONS http://www.dmg.org/faq.htm—"Frequently Asked Questions," printed from the Internet Apr. 18, 2003, 2 ps.

https://www.crmdaily.com/perl/story/13981.html—Dan McDonough, "New SPSS Data Mining Apps Speak in Tongues," Oct. 5, 2001, printed from the Internet on Sep. 15, 2003, 3 pages.

"Welcome to The Real-Time Enterprise," *PeopleSoft. Inc.*, undated, 8 ps.

"DataDistilleries Real-Time Suite," *DataDistilleries*, undated, 2 ps.

"DataDistilleries Analytical Suite," *DataDistilleries*, undated, 2 ps.

PowerPoint Presentation, Analytical CRM, *SAP AG*, undated, 24 ps.

U.S. Appl. No. 10/454,370, filed Jun. 3, 2003, Kraiss et al.

U.S. Appl. No. 10/633,884, filed Aug. 4, 2003, Kraiss et al.

U.S. Appl. No. 10/652,872, filed Aug. 29, 2003, Kraiss et al.

U.S. Appl. No. 10/665,249, filed Sep. 18, 2003, Kraiss et al.

Bia et al., "Multilingual Markup of Digital library Texts Using XML, TEI and XSLT," Obtained from the Internet on Dec. 10, 2004 at http://www.idealliance.org/papers/dx_xmle03/papers/03-01-03/03-01-03.pdf>, 8 pages.

Buchner et al., "Data Mining and XML: Current and Future Issues," *Web Information Systems Engineering*, Proceedings of the First International Conference on Hong Kong, China, Jun. 19-21, 2000, pp. 131-135.

Clifton et al., "Emerging Standards for Data Mining" *Computer Standards & Interfaces*, 2001, 23:187-193.

Perlman "The FirstSearch User Interface Architecture: Universal Access for any User, in many Languages, on any Platform," Obtained from the Internet on Dec. 9, 2004 at http://delivery.acm.org/10.1145/360000/355465/p1-perlman.pdf?key1=355465&key2=2012103011&coll=guide&dl=guide&cfid=33450396&cftoken=55456229>8 pages.

\* cited by examiner

Predictive Model Document with Embedded Extension Document:

```
<PMML version="2.0">                          241        242
    <Header copyright="www.sap.com" description="ID1"/>
    <DataDictionary numberOfFields="6">
         <DataField  name="JW_ATTR"
243              displayName="ID2" optype="categorical">
         </DataField>                    244
    </DataDictionary>
    <TreeModel>
        ...       # [actual mining model is contained here] # ...
    </TreeModel>
    <Extension  extender="sap.com" name="Model Texts">
         <MODELTEXTS name="ARUNJW_TESTNL">  251a   252a
             <GUID id="ID1">
242              <TEXT lang="EN" value="This model describes
                 customer attractivity based on survey data"/>
                 <TEXT lang="DE" value="Dieses Modell
                 beschreibt die kundenattraktivität basierend auf
                 Umfrageergebnissen"/>      252b
                 ...       251b
250          </GUID>       244
             </GUID id="ID2">       251a              254a
                 <TEXT lang="EN" value="Customer
                 Attractivity"/>   251b
                 <TEXT lang="DE" value="
                 Kundenattraktivität"/>
                 ...              254b
             </GUID>
         </MODELTEXTS>
    </Extension>
</PMML>
```

Model Information

| Name | ARUNJW_TESTNL | Description | This model describes customer attractivity based on survey |
|---|---|---|---|
| Created By | STUMPA | Created On 312 | 6/17/03 1:17 PM |
| Changed By | STUMPA | Modified On | 6/17/03 12:00 PM |
| Trained on | 6/17/03 12:00 PM | Mining Function | Approximation |
| Source Server | Q2I | Source Model Name | ARUNJW_TESTNL |
| Mining Method | SAP Regression | | |

Model Field:

| Name | Description | Field Type | Data Type |
|---|---|---|---|
| JW_ATTR — 321 | Customer Attractivity — 331 | Categorical | String |
| JW_IND — 322 | Industry — 332 | Categorical | String |
| JW_PURP — 323 | Purchase Planned — 333 | Categorical | String |
| JW_RAND — 324 | Random Value — 334 | Categorical | Double |
| JW_SALVIS — 325 | Sales Representative Requeste — 335 | Categorical | String |
| JW_SIZE — 326 | Company Size — 336 | Categorical | Integer |
| JW_VOL2 — 327 | Volume 2 — 337 | Continuous | Double |

Delete

300 → , 310

Modellinformationen

| | 410 | | |
|---|---|---|---|
| Name | ARUNJW_TESTNL | Beschreibung | Dieses Modell beschreibt die Kundenattraktivität basierend auf Umfrageergeb |
| Angelegt von | STUMPA | Angelgt am  412 | 17.06.03 13:17 PM |
| Geändert von | STUMPA | Geändert am | 17.06.03 12:00 PM |
| Trainiert am | 17.06.03 12:00 PM | Mining-Funktion | Näherung |
| Quellserver | Q2I | Ursprungsmodellname | ARUNJW_TESTNL |
| Mining Methode | SAP Regression | | |

Modellfelder

| Name | Beschreibung | Feldtyp | Datenart |
|---|---|---|---|
| JW_ATTR | Kundenattraktivität  431 | Categorical | String |
| JW_IND | Industrie  432 | Categorical | String |
| JW_PURP | 1st eine Anschaffung geplant  433 | Categorical | String |
| JW_RAND | Zufallszahl  434 | Categorical | Double |
| JW_SALVIS | Vertreterbesuch gewuenscht  435 | Categorical | String |
| JW_SIZE | Grösse des Unternehmens  436 | Categorical | Integer |
| JW_VOL2 | Umfang 2  437 | Kontinuierlich | Double |

Loschen

*FIG. 7*

MULTI-LANGUAGE SUPPORT FOR DATA MINING MODELS

CROSS REFERENCE TO RELATED APPLICATION

The present application claims the benefit of the filing date of U.S. Provisional Application No. 60/471,048, which was filed on May 16, 2003.

TECHNICAL FIELD

This invention relates to providing multi-language support for data mining models.

BACKGROUND

A data mining model typically includes rules and patterns derived from historical data that has been collected, synthesized and formatted. In some cases, these models are used in combination with an analytical software application to generate predictive outputs. In order for applications or software application designers to apply or change data mining models, they need to understand how the models are organized and what information the models contain. As such, the data mining models typically include annotated textual descriptions of model semantics. These annotations can be related to an entire model and also to elements of the model, such as input or output data fields. Often, however, the textual descriptions are hard-coded in a single written language (e.g., English or German), thereby limiting the scope or applicability of such descriptions.

Models that are defined using the Predictive Model Markup Language, or PMML, also often contain descriptions that are hard-coded in a single language. One goal of PMML is to support the exchange of data mining models between different data mining servers, applications or visualization tools. PMML is a markup language that uses the Extensible Markup Language (XML) as its meta-language. The PMML standard does not directly address the support of descriptions in different written languages. For example, the descriptions for models and model fields using PMML are typically considered as flat textual strings that do not address the existence of the descriptions in multiple languages. In such instances, a front-end software application that requests predictive data using a model in PMML format may only receive descriptions of the models and model fields in a single language (e.g., only English or only German).

The exchange of data mining models—and the predictive output from those models—between different applications is not limited to users that are fluent in a single language. Rather, administrators of the data warehouses where mining models are created and administrators of the various front-end software applications communicate in various languages, such as English, German, and French. In addition, end-users of the front-end applications may also been faced with the textual descriptions contained in mining models. For example, call-center agents in different countries may have to analyze a textual representation of the rules contained in the mining model, to "understand" the rational of a system decision, and these textual descriptions are typically based on the descriptions contained in the mining models. Thus, an English-speaking administrator or front-end software user may be deterred from using or applying certain data mining models if the description of those models and the data fields are provided only in German text.

For example, an English-speaking agent of a front-end call center application may want to request a prediction (e.g., likelihood that a specific customer will complete a purchase) using a predictive model. This call-center agent may desire to see some metadata from the predictive model, such as a description of the model, the description of the data fields, and even the textual description of the rules which led to the prediction. This information is potentially important if the predictive output returned to the front-end application was processed while missing some value for an input data field, thus causing the predictive output to be less than optimal. In this case, the agent may have to be warned that some information was missing, that the prediction result could be of less quality, and that the agent should try to get the missing information from the customer. All the texts exposed to the call-center agent or to an administrator deploying mining models and attaching them to a front-end application, are based on the descriptions contained in the mining model. If the predictive model that generated the output for the front-end application provided descriptions of the model and the data fields in German text only, the English-speaking front-end application user may not understand those textual descriptions and find the predictive output to be less than helpful. Similarly, an English-speaking administrator who has to deploy the model and who has to make it applicable to the front-end application may not understand the information contained in the model.

SUMMARY

An analytical application provider may provide certain middleware functionality that includes updating model output to include textual descriptions of the data mining model and the data fields in a language selected by a front-end application.

Certain implementations of the invention relate to a computer-implemented method for providing multi-language support for data mining models. The method includes receiving an extension document having first and second entries associated with a unique identifier in a textual description field of a data mining model. The first entry includes textual information in a first language, and the second entry includes textual information in a second language. The method further includes processing a request from a front-end application to execute an analytical task associated with the data mining model, and using the first entry of the extension document and the unique identifier to output the textual information in the first language to the front-end application.

Some implementations relate to computer-implemented method for outputting textual descriptions of data fields in a data mining model in a selected language. The method includes receiving an extension document corresponding to a data mining model, and storing contents of the extension document in a database. The data mining model includes a unique identifier associated with a textual description of a data field in the model. The contents of the extension document that are stored in the database include first and second entries associated with the unique identifier. The first entry includes the textual description of the data field in a first language, and the second entry includes the textual description of the data field in a second language. The method also includes outputting to a front-end application an updated model output that includes the first entry from the contents of the extension document such that the textual description of the data field is output in the first language.

The details of one or more implementations of the invention are set forth in the accompanying drawings and the description below. Other features, objects, and advantages of the invention will be apparent from the description and drawings, and from the claims.

DETAILED DESCRIPTION

Figure 1:
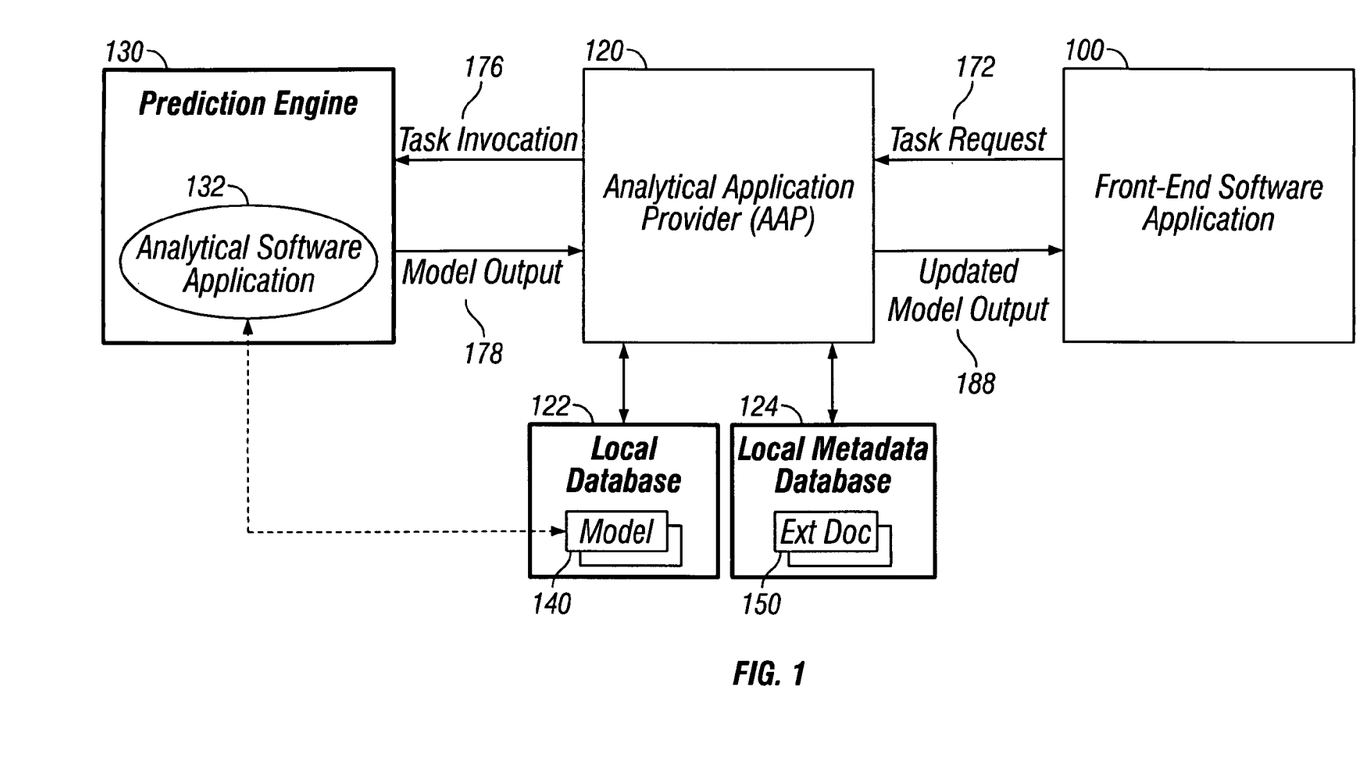
FIG. 1 is a block diagram showing the interaction of a front-end application with a prediction engine using an analytical application provider (AAP) in accordance with certain implementations of the invention.

Referring to FIG. 1, an analytical application provider (AAP) 120 interacts with a front-end application 100 to provide a predictive output to the front-end application 100. The AAP 120, sometimes referred to as an Intelligence Connector, operates with certain middleware functionality to couple front-end applications 100 with various prediction engines 130 or other back-end analytical systems. The prediction engine 130 executes various data mining models at the instruction of the AAP 120 and provides the output from the executed model to the AAP 120. This model output may include a particular prediction value and additional metadata associated with the model, such as textual descriptions of the data fields. After the AAP 120 receives the model output from the prediction engine 130, the AAP 120 may update the model output to the front-end application 100 to include textual descriptions of the model and the data fields in a language (e.g., German, English, or French) selected by the front-end application 100.

Briefly describing the operation of the implementation shown in FIG. 1, the AAP 120 initially receives a task request 172 from the front-end application 100. The task request may contain the task name and an input data, such as information related to a customer or user of the front-end application 100. The AAP 120 invokes 176 the prediction engine 130 to execute a predictive model 140 based upon input information received from the front-end application 100, from other backend analytical systems such as a data warehouse (FIG. 2), or from a combination thereof. In this implementation, the prediction engine 130 receives the model 140 from a local database 122 of the AAP 120, and an analytical software application 132 within the engine 130 executes the analytical tasks associated with the predictive model 140.

After the prediction engine 130 executes these analytical tasks, the AAP 120 receives the model output 178, which may include output values for particular data fields and a textual description of each data field. In addition, the AAP 120 determines whether the textual descriptions include external identifiers that indicate the model offers multi-language support (described in more detail below). If the predictive model or the model output does contain such external identifiers, the AAP 120 accesses a local database 124 that stores the contents of an extension document 150, including textual descriptions for the data fields in multiple languages (e.g., English, German, and French). The AAP 120 inserts the proper textual descriptions into the model output according to the language selected by the front-end application 100, thus creating an updated model output. This updated model output includes the output values for data fields originally determined by the analytical software application 132 and the textual descriptions of those data fields in the proper language (e.g., English, German, or French). After creating the updated model output, the AAP 120 sends the updated model output to the front-end application 100.

Still referring to FIG. 1, the AAP 120 provides certain middleware functionality. The front-end application 100 need not be directly coupled to the prediction engine 130 and analytical software application 132. This indirect connection via the AAP 120 provides certain advantages. For example, front-end application 100 need not refer to the precise prediction engine 130 and precise data warehouse 160 that are to be used, but would only refer to the task to be executed within AAP 120. The task definition established by the administrator of the AAP 120 contains the information of the prediction engine 130 and the data store 160 to be used for a predictive task, which could be changed dynamically without impact on front-end application 100. This provides independence to front-end application 100, leading to reduced maintenance costs. The generic application interface with the AAP 120 allows the front-end application 100 simply to provide the task name and input data. In addition, various different engines 130 and data warehouses 160 can be more easily introduced into the system without adding extra interface overhead to front-end application 100. The AAP 120 may manage the engine- and data warehouse-specific details.

Figure 2:
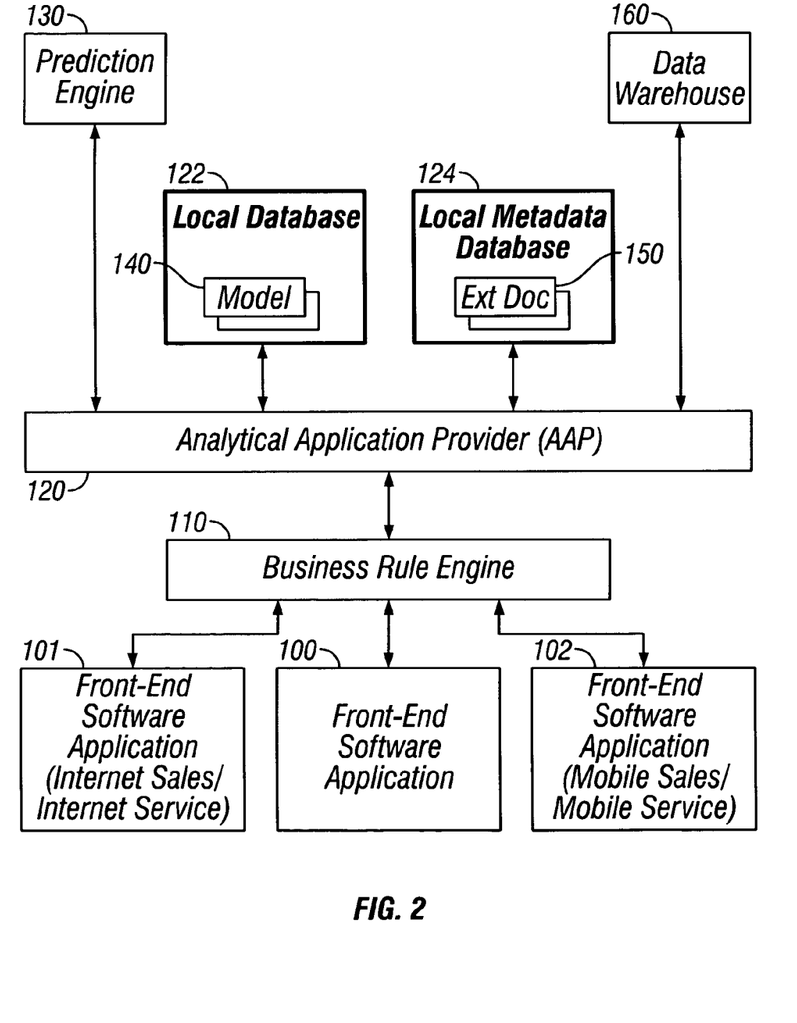
FIG. 2 is a block diagram of a computing system, including the AAP from FIG. 1, that provides multi-language support for predictive model output in accordance with some implementations of the invention.

Referring to FIG. 2, some implementations may use a business rule engine 110 that couples the front-end application 100 with the AAP 120. In these implementations, business rule engine 110 passes requests sent from front-end applications 100, 101, and 102 directly to the AAP 120. The business rule engine 110 also passes responses from the AAP 120 to the front-end applications 100, 101, and 102. Moreover, the business rule engine 110 also uses the output information in the responses sent from AAP 120 to determine if certain events should be triggered in the front-end application 100, 101, or 102. As part of the analytical front-end, the business rule engine 110 provides functionality for the business rules that are to be applied. For example, the business rule engine 110 may apply certain rules that initiate the offering of special discount offers to new or existing customers. The business rule engine 110 is coupled to the front-end application 100 and may also be coupled to various other front-end applications, such as an internet service application 101, a mobile sales/service application 102, and other applications (such as interactive voice response systems (IVRS), or automatic teller machines (ATM's)).

Still referring to FIG. 2, the data warehouse 160 and other various components may serve as part of an analytical backend. The data within data warehouse 160 may include customer profiles, historical customer orders, and the like. This analytical back-end may provide a framework and storage mechanisms for data mining models or other analytical data stores that are stored externally from AAP 120. For example, the predictive model 140 may be stored in the data warehouse 160 rather than in a local database of the AAP 120. In such cases, the AAP 120 may invoke the prediction engine 130 of the data warehouse 160 to receive the input data and return the model output 178 to the AAP 120. Alternatively, a data mining provider (not shown in FIG. 2) is part of the analytical back-end that is used for model deployment. Using real-time connector, a predictive model 140 can be exported to AAP 120 and stored in the local database 122 for future use. Such local versions of the models 140 are stored in local databases 122 to allow the AAP 120 to use any prediction engines that can interpret the model 140, as shown in FIG. 2.

Figure 3:
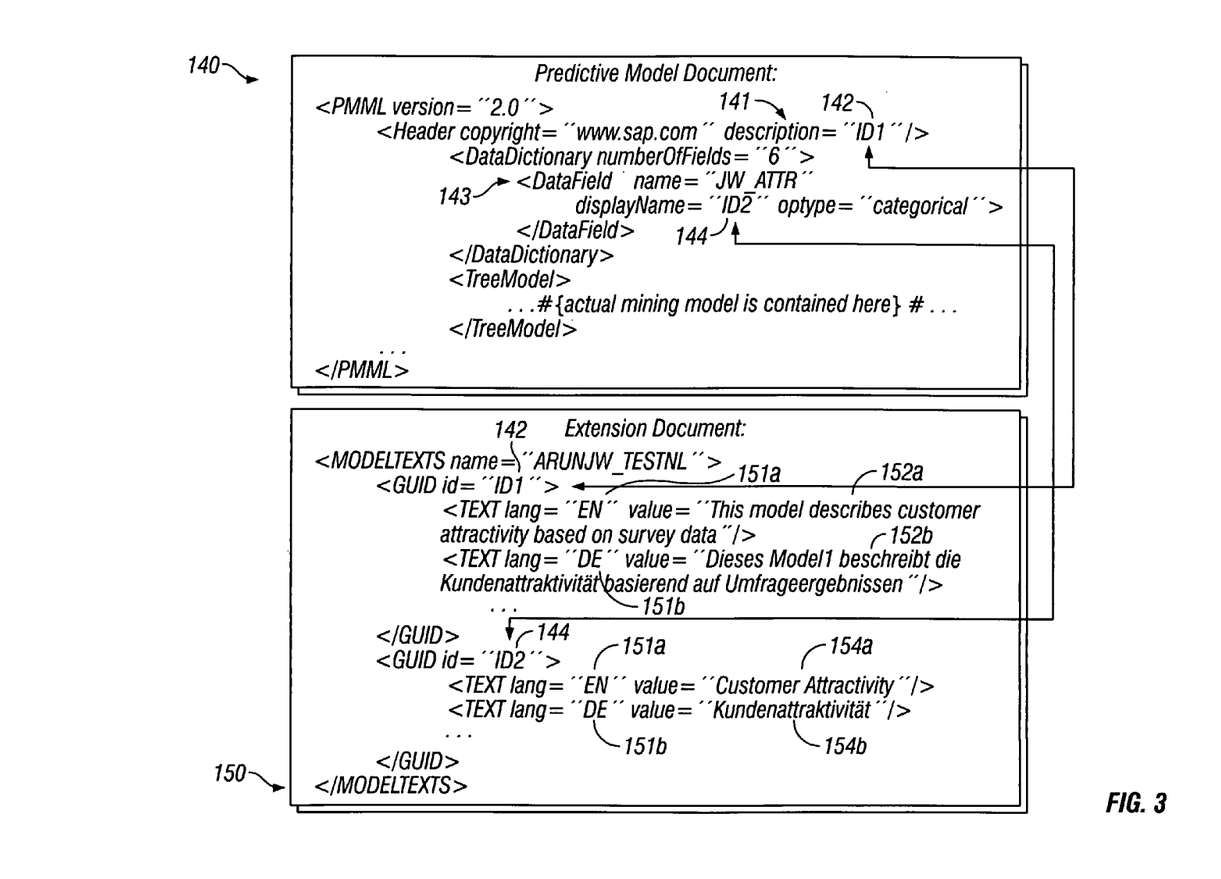
FIG. 3 is an illustration of portions of a predictive model document and a corresponding multi-language support extension document in accordance with an implementation of the invention.

Referring to FIG. 3, each predictive model 140 that provides multi-language support has a corresponding extension document 150. The predictive model 140 includes external identifiers 142 and 144 that are associated with the model description 141 and the data fields 143. The extension document 150 contains textual strings 152*a*, 152*b*, 154*a*, or 154*b* that are associated with the external identifiers 142 and 144 from the corresponding model 140. Within the extension document 150, each textual string 152*a* or 152*b* may be sorted according to its associated external identifier 141 and language identifier 151*a* or 15*b*. In this implementation, the language identifier 151*a* that represents the English language is "EN," and the language identifier 151*b* for German is "DE." Thus, the model description 141 and the data field description 143 in the model 140 may be mapped to the language-specific descriptions 152*a*, 152*b*, 154*a*, and 154*b* in the extension document 150 using the external identifiers 142 and 144. For example, the data field 143 labeled "JW_ATTR" in the predictive model 140 is associated with the external identifier "ID2" 144. The textual description of this data field in English ("EN") may be obtained by mapping the external identifier 144 and the language identifier 151*a* in the extension document 150, which provides a textual description 154*a* of "Purchased Planned." The AAP 120 may create an updated model output that includes this English-language textual description for the data field 143 labeled "JW_ATTR" (one implementation is described below in connection with FIG. 6).

In the implementation shown in FIG. 3, the predictive model 140 and the extension document 150 are generated in a PMML-compliant format. A PMML-compliant format is one that adheres to the syntax of the standardized Predictive Modeling Markup Language (PMML). PMML is used to define the components of a data mining model in a standard form that can be imported to all PMML consumer engines, such as IBM Intelligent Miner, SAP Local Prediction Server, and the like. Furthermore, the external identifiers 142 and 144 ("ID1" and "ID2," respectively) are global unique identifiers (GUIDs) that are unique within the entire model 140. Thus, each external identifier 142 or 144 is associated with only one data field description 143 or model description 141 for a given model 140.

The model 140 and extension document 150 may be generated in a data warehouse 160, a data mining provider, or other back-end analytical system. The AAP 120 may then receive both the model 140 and the extension document 150 for use in predictive tasks. Alternatively, the AAP 120 may receive only the extension document 150 while the model 140 is stored in the data warehouse 160, data mining provider, or other back-end analytical system. In any event, the AAP 120 stores in a local metadata database 124 the contents of the extension document 150, which may include the name 156 of the corresponding model 140, the external identifiers 142 and 144, and the textual strings 152*a*, 152*b*, 154*a*, and 154*b* associated with each external identifier. In addition, the AAP 120 may store information in the local metadata database 124 relating to which prediction engine 130 executed the model 140 in response to each task request.

Figure 4:
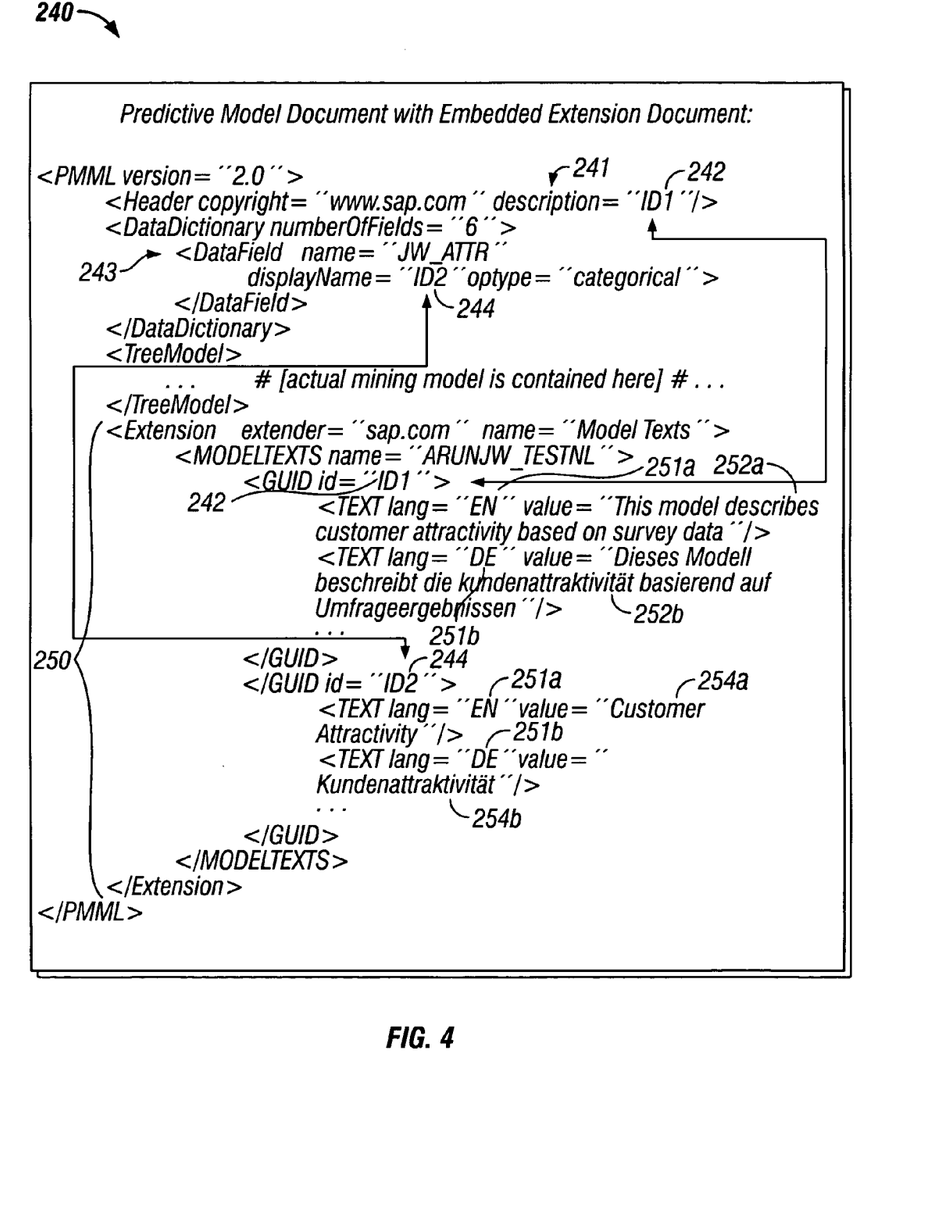
FIG. 4 is an illustration of a portion of a predictive model document with an embedded multi-language support extension document in accordance with another implementation of the invention.

The extension document 150 need not be a wholly separate document from the predictive model 140. Rather, as shown in FIG. 4, an extension document 250 may be embedded in a predictive model 240. Similar to the implementation described above, the model description 241 and the data field description 243 in the model 240 may be mapped to the language-specific descriptions 252*a*, 252*b*, 254*a*, and 254*b* in the extension document 250 using the external identifiers 242 and 244 and the language identifiers 251*a* and 251*b*. In the implementation shown in FIG. 4, the predictive model 240 and the extension document 250 are generated in a PMML-compliant format, where the extension document 250 is contained in the predictive model 240. Regardless of whether the model 240 is imported from a data warehouse 160 or another back-end analytical system, the AAP 120 receives the model 240 so that the contents of the extension document 250 may be stored in the metadata database 124 for use in creating an updated model output 188.

Figure 5:
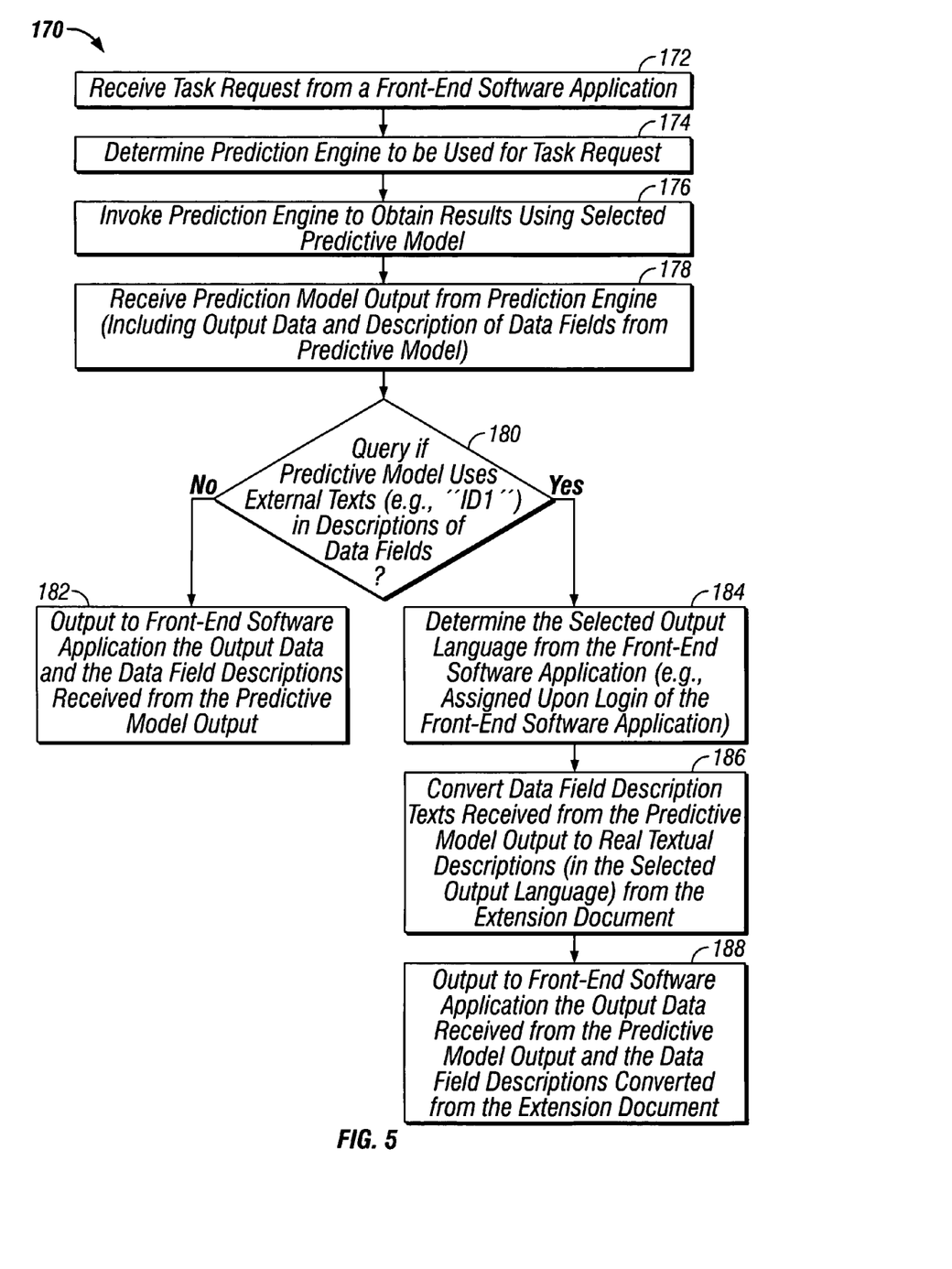
FIG. 5 is a flow diagram of a method for providing multi-language support for predictive model output in accordance with an implementation of the invention, which may be accomplished using the computing system of FIG. 1.

Referring to FIG. 5, the AAP 120 is capable of providing model output to the front-end application 100 from execution of either a predictive model 140 with multi-language support or from a predictive model containing description in a single language. This process 170 may be repeatedly performed between the AAP 120 and multiple front-end applications 100, 101, and 102 as part of a real-time analytics system. Also, a somewhat similar process may be performed to provide model output (including language-dependent textual descriptions) to the administrator or administrator workbench of the AAP 120. It is understood that the process 170 is only one implementation, and the steps need not be performed in the exact order shown in FIG. 5.

At run-time, the AAP 120 receives a task request (step 172) from the front-end application 100 to execute an analytical task, such as a prediction task. This task request includes a task name and input information that is used for execution of the analytical task. In step 174, the AAP 120 uses the task name to determine a prediction engine 130 and a data warehouse 160 that will be used for executing the task. In step 176, the AAP 120 then invokes analytical software application 132 on the engine 130 to receive a predictive model and execute analytical tasks associated with that model. The analytical software application 132 uses information contained within the data warehouse 160 and the input information from the task request during execution of the analytical tasks. After executing the analytical tasks associated with the predictive model, the AAP 120 then receives the model output (step 178) from the analytical software application 132. This model output includes information that was generated during the execution of the analytical tasks, such as predictive output information. If the predictive model 140 provides multi-language support, the model output from the prediction engine 130 may include the external identifiers 142 and 144 associated with the model description 141 and the description of the data field 143. Alternatively, if the predictive model includes textual descriptions in a single language, the model output may include those textual strings.

As shown in step 180, the AAP 120 queries if the predictive model 140 uses external identifiers 142 and 144. This may be performed in any number of ways. For example, the AAP 120 may query if the model 140 that was executed by the prediction engine 130 has a corresponding extension document 150 or if the contents of a corresponding extension document 150 are stored in the local metadata database 124 of the AAP 120. This query step 180 may be performed at any time after the task request is received from the front-end application 100 and the AAP 120 determines which predictive model 140 should be executed by the prediction engine 130. If the AAP 120 determines that the predictive model does not contain external identifiers (e.g., the model does not provide multi-language support), the AAP 120 then sends a response back to the front-end application 100, which includes the output information and textual descriptions provided by execution of the model in the analytical software application 132. If the AAP 120 determines that the predictive model 140 executed by the engine 130 does contain external identifiers 142 and 144, the AAP determines which language (e.g., English, German, or French) is selected by the front-end application 100 (step 184). This determination may be performed when the front-end application 100 logs on to the AAP 120 to send the initial task request. Otherwise, the selected language of the front-end application may be included as part of the task request received from the front-end application 100, or may be obtained from the runtime environment (e.g., the operating system, Java runtime, etc.). In step 186, the AAP creates an updated model output that inserts the proper textual descriptions 152*a* (or 152*b*) and 154*a* (or 154*b*) in the language selected by the front-end application 100 for the external identifiers 142 and 144. Then, in step 188, the AAP 120 sends the updated model output to the front-end application 100. The updated model output may include information received from execution of the predictive model 140 in the prediction engine 130 and language-specific textual descriptions from the contents of the extension document 150.

An administrator of the front-end application 100 may define the scope and content of the task request that is sent from front-end application 100 to the AAP 120. This may occur at design-time, or may occur dynamically during run-time. The task request includes a task name and other input information that is used during execution of the task. The AAP 120 uses the task name to identify the type of task to be executed, such as a prediction task using a particular prediction model. In one implementation, these tasks are defined on AAP 120. Because the front-end application 100 needs only to provide the task name and input value information, the definition of tasks on AAP 120 provides all of the detailed prediction engine and data warehouse information used for task execution. Different engines and data warehouses can be easily introduced into the system without changing the interface between AAP 120 and the front-end application 100.

Even though the AAP 120 may send an updated model output to the front-end application 100, the textual descriptions of the model and the data fields are not always exposed to the user of the front-end application 100. Instead, the front-end application 100 may send a task request and respond to the predictive output without interference from the user. In circumstances where the user of the front-end application 100 desires to evaluate the results from the predictive model, the user may view updated model output, or at least portions thereof.

In some implementations, an administrator of the AAP 120 may desire to view the predictive model 140 and the textual descriptions associated with the model and the data fields. For example, the administrator of the AAP 120 may need to view the textual descriptions of the input and output data fields in a predictive model 140 in order to establish or maintain a task definition. Moreover, the administrator of the AAP 120 may desire to evaluate or view the model output, including the textual descriptions of the model and the data fields, that is received from the model 140 executed by the prediction engine 130. In these circumstances, the administrator may login to the AAP 120 with a pre-selected language (e.g., English, German, or French). When the administrator of the AAP 120 views the textual descriptions of the model and the data fields using, for example, a workbench software system, the AAP 120 retrieves the proper textual descriptions according to the language pre-selected by the administrator and displays those textual descriptions to the administrator of the AAP 120.

Figure 6:
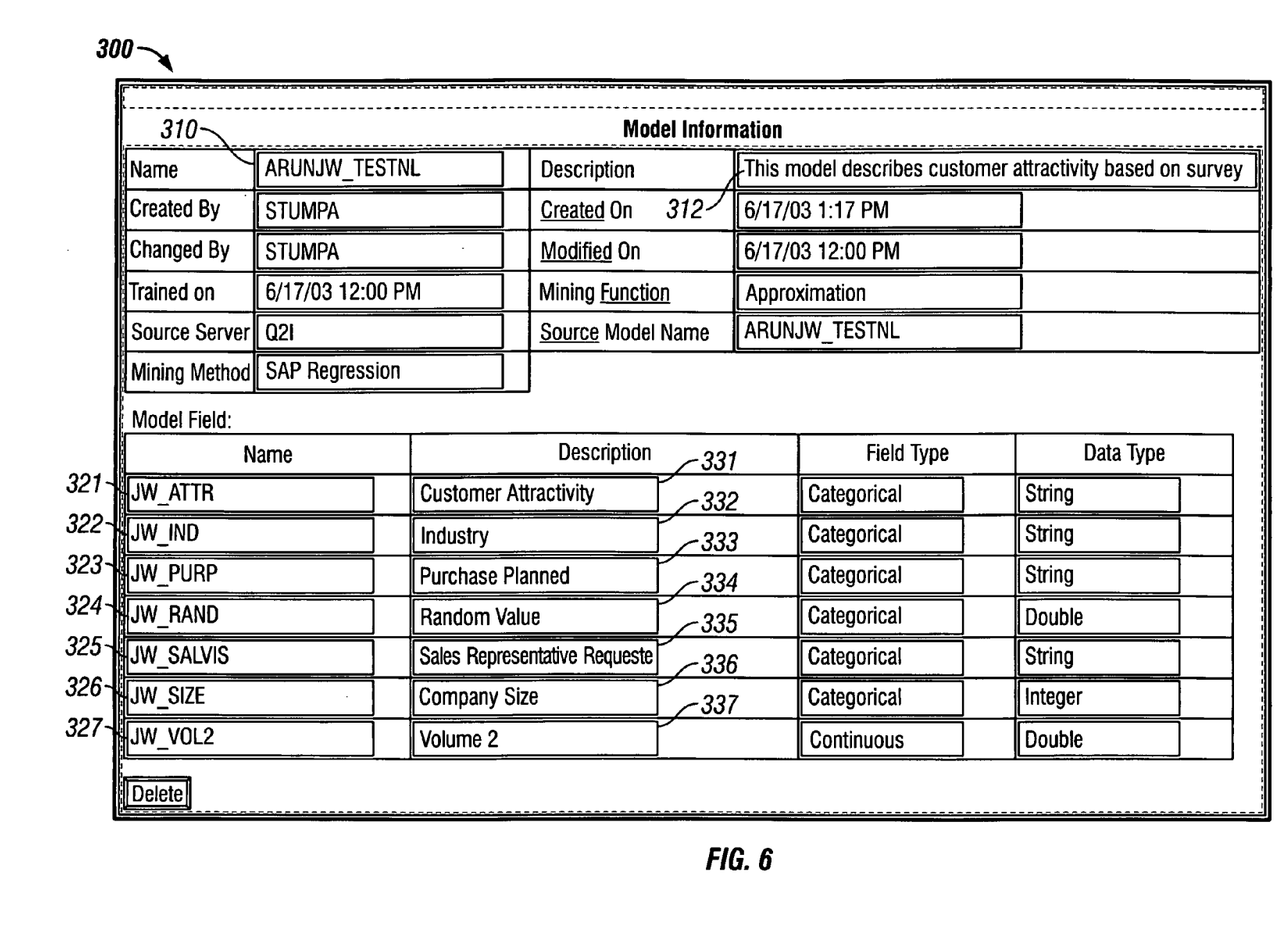
FIG. 6 is a screen display of model details, which includes the English textual description of the predictive model and of the data fields from the implementation illustrated in FIG. 3.

Referring to FIG. 6, information on a predictive model 140 may be displayed on screen in a model information window 300. The information window 300 displays the model name 310 and the names of the data fields 321, 322, 323, 324, 325, 326, and 327. These names 310 and 321-27 are shown in the information window 300 just as they are expressed in the predictive model 140 (FIG. 3). For example, the data field 143 shown in FIG. 3 is labeled "JW_ATTR" in the model 140, and the same label is displayed for the data field name 321 in the information window 300. The information window 300 also displays the model description 312 and the data field descriptions 331-37, yet these textual descriptions 312 and 331-37 are displayed in a selected language. In this implementation, the AAP 120 retrieves the proper textual descriptions from the contents of the extension document 150 that are stored in the metadata database 124 and displays those textual descriptions in the information window 300 according to the pre-selected language. For example, the model 140 shown in FIG. 3 contains the external identifier 144 "ID2" for the description of the data field 143 named "JW_ATTR," yet the AAP 120 maps the external identifier 144 to the contents of the extension document 150 (FIG. 3) stored in the metadata database 124 and retrieves the textual description 154*a*. This English-language description 154*a* of the data field 143 is then displayed in the information window 300 as the data field description 331 "Customer Attractivity." Similarly, the English-language description 152*a* for the model 140 (FIG. 3) may be displayed in the information window 300 as the model description 312.

Figure 7:
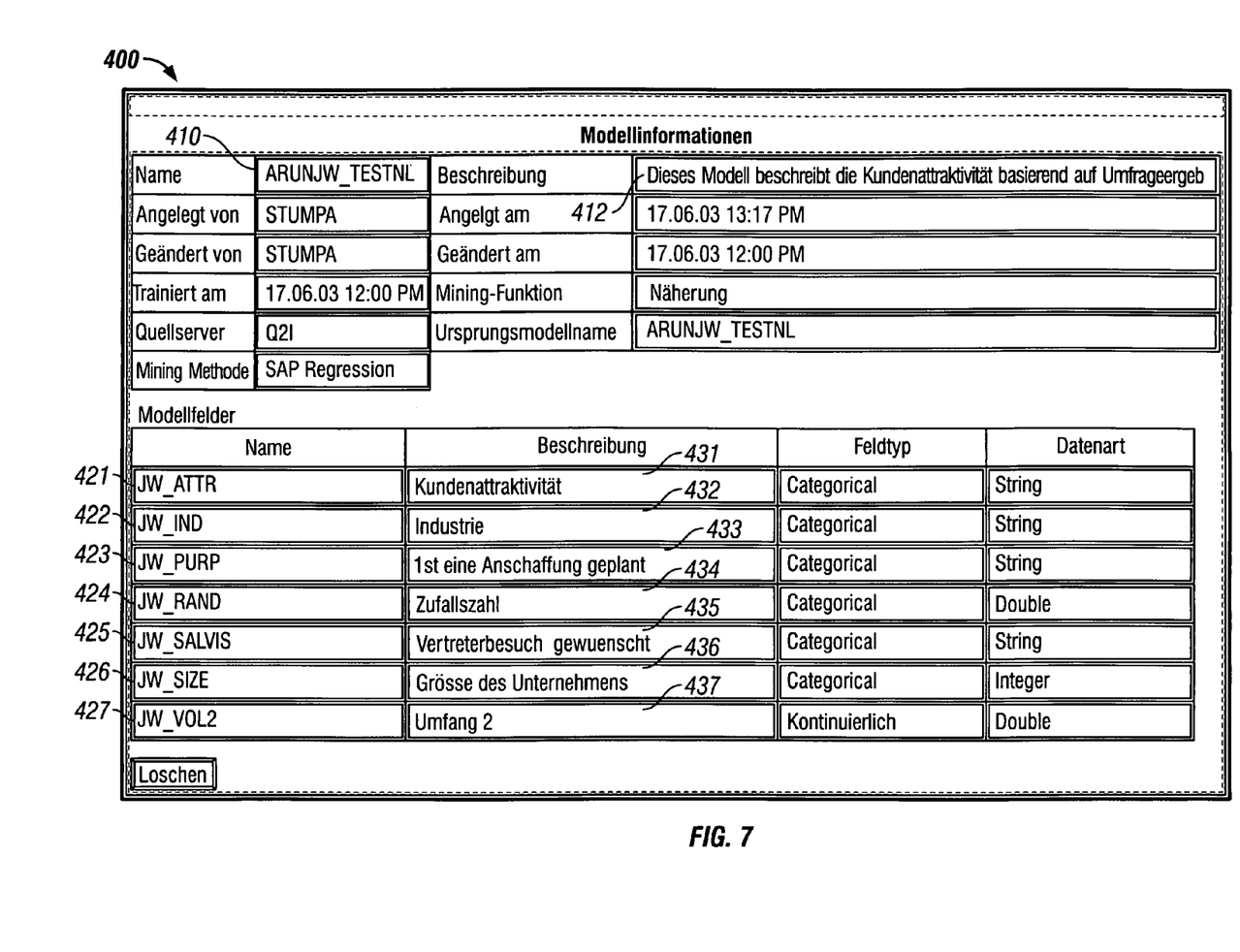
FIG. 7 is a screen display of model details, which includes the German textual description of the predictive model and or the data fields from the implementation illustrated in FIG. 3.

Referring to FIG. 7, if the pre-selected language is change from English to German, the information for the same model 140 may be displayed in an information window 400 that includes textual descriptions in German. Similar to the information window 300 described in connection with FIG. 6, the model name 410 and the data field names 421-27 are shown in the information window 400 just as they are expressed in the predictive model 140 (FIG. 3). In this implementation, however, the pre-selected language is German rather than English. As such, the AAP 120 retrieves the German-language textual descriptions from the contents of the extension document 150 that are stored in the metadata database 124 and displays those textual descriptions in the information window 400. For example, the model 140 shown in FIG. 3 contains the external identifier 144 "ID2" for the description of the data field 143 named "JW_ATTR," yet the AAP 120 maps the external identifier 144 to the contents of the extension document 150 (FIG. 3) stored in the metadata database 124 and retrieves the textual description 154*b*. This German-language description 154*b* of the data field 143 is then displayed in the information window 400 as the data field description 431 "Kundenattraktivitat."

A number of implementations of the invention have been described. Nevertheless, it will be understood that various modifications may be made without departing from the spirit and scope of the invention. For example, the multi-language support is not limited to the languages described above. Rather, the textual descriptions of the models and the data fields may include any number of languages spoken or understood by administrators of front-end applications or AAPs.

Furthermore, the multi-language support is not limited to data mining models that provide predictive output, such as predictive models that are PMML-compliant. Rather, the AAP may invoke an analytical engine to execute tasks associated with any data mining model, and that data mining model may have a corresponding extension document containing textual descriptions of the data fields in a plurality of languages. The AAP 120 may use the contents of the extension document to create an updated model output containing textual descriptions in a selected language.

In another implementation, the external identifiers 142 and 144 (FIG. 3) may include special prefixes. For example, the model 140 may include an external identifier "@§ID1§@" instead of the external identifier 142 "ID1." This special prefix would enable the AAP 120 to determine that the model 140 includes external identifiers (e.g., provides multi-language support) even if no contents from the corresponding extension document 150 are stored in the metadata database 124. The AAP 120 may have a predefined textual string to insert into the textual description when the AAP 120 finds an external identifier having a special prefix but with no corresponding identifier in the metadata database 124. For example, the AAP 120 may insert the phrase "No text available" into the textual description if the pre-selected language is English, or "Beschreibung nicht vorhanden" if the pre-selected language is German. If such external identifiers with special prefixes were used, the external identifiers would not be exposed to the front-end application.

In other implementations, it is not necessary that the system include data warehouse 160 or other back-end components. For example, these components are not needed when the data stores and prediction model 140 used during the execution of analytical tasks are stored in a local database 122 and when the prediction engine 130 is local to the AAP 120.

Moreover, the AAP 120 may receive data mining models, extension documents, or model output from third-party data mining providers. The AAP 120 can also connect to third-party mining providers using a real-time connector, and these third-party mining providers can export and import models 140 and provide predictions based on their local models. These third-party mining providers can be located on local or remote servers.

Accordingly, other implementations are within the scope of the following claims.

What is claimed is:

1. A computer-implemented method for outputting textual descriptions of data fields in a data mining model in a selected language, the method comprising:
   receiving at a computer system an extension document corresponding to a data mining model, the model including a unique identifier associated with a textual description of a data field in the data mining model;
   storing contents of the extension document in a database of the computing system, the contents of the extension document having first and second entries associated with the unique identifier, the first entry including the textual description of the data field in a first language, and the second entry including the textual description of the data field in a second language;
   receiving a task request from a front-end application, the task request including input data for use with the data mining model;
   in response to the task request from the front-end application, invoking a back-end analytical engine to execute the data mining model based upon the input data of the task request;
   receiving a back-end model output from the back-end analytical engine, the back-end model output including information generated in response to the execution of the data mining model based upon the input data of the task request;
   inserting the first entry from the contents of the extension document into the back-end model output to produce an updated model output; and
   outputting to the front-end application the updated model output that includes the first entry from the contents of the extension document such that the textual description of the data field is output in the first language.

2. The method of claim 1, wherein the data mining model and the extension document are PMML-compliant.

3. The method of claim 1, further comprising determining from a login by the front-end application that the textual description of the data field should be output in the first language.

4. The method of claim 1, further comprising obtaining a request from the front-end application for execution of a prediction task.

5. The method of claim 4, wherein the back-end analytical engine comprises a prediction engine, further comprising invoking execution of the prediction task by the prediction engine using the data mining model.

6. The method of claim 1, further comprising substituting the first entry of the extension document for the unique identifier such that the textual description of the data field is output in the first language.

7. The method of claim 1, wherein the first language is English and the second language is German.

8. A computer-implemented method for providing multi-language support for data mining models, the method comprising:
   receiving at a computer system an extension document having first and second entries associated with a unique identifier in a textual description field of a data mining model, the first entry including textual information in a first language, and the second entry including textual information in a second language;
   processing at the computer system a request from a front-end application to execute an analytical task associated with the data mining model, the request from the front-end application including input data that is employed by a back-end analytical engine to execute the data mining model to generate a back-end model output, the back-end model output including the unique identifier; and
   in response to receiving the back-end model output from the back-end analytical engine, outputting to the front-end application an updated model output that includes the first entry such that the textual information is output in the first language.

9. The method of claim 8, wherein the extension document is received from the back-end analytical system.

10. The method of claim 8, further comprising storing contents of the extension document in a database, the contents including the first and second entries.

11. The method of claim 8, further comprising determining from a login by the front-end application that the textual information should be output in the first language.

12. The method of claim 8, wherein the request from the front-end application is a request for execution of a prediction task and wherein the back-end analytical engine comprises a prediction engine, further comprising invoking execution of the prediction task by the prediction engine using the data mining model.

13. The method of claim 12, wherein the data mining model and the extension document are PMML-compliant.

14. The method of claim 12, wherein the data mining model includes a data field indicative of a predicted result of a particular transaction between the front-end application and a customer.

15. The method of claim 8, wherein the first language is English and the second language is German.

16. The method of claim 8, further comprising inserting the first entry of the extension document into the back-end model output, wherein the first entry replaces the unique identifier to produce an updated model output.

17. The method of claim 8, wherein the data mining model includes rules and patterns derived from historical data that has been collected, synthesized and formatted.

18. The method of claim 8, wherein the updated model output includes the output values for data fields originally determined by the back-end analytical engine and the textual description of those data fields in the first language.

* * * * *